United States Patent [19]

Atkinson et al.

[11] Patent Number: 4,931,819
[45] Date of Patent: Jun. 5, 1990

[54] FILM CASSETTE AND METHOD OF ASSEMBLING THE SAME

[75] Inventors: William C. Atkinson, Webster; Roger A. Fields, Pittsford, both of N.Y.

[73] Assignee: Eastman Kodak Company, Rochester, N.Y.

[21] Appl. No.: 379,743

[22] Filed: Jul. 14, 1989

[51] Int. Cl.⁵ .............................................. G03B 17/26
[52] U.S. Cl. .................................... 354/275; 354/276; 242/71; 242/71.1
[58] Field of Search ............... 354/275, 340, 341, 344, 354/277, 281, 276, 212, 213; 242/71, 71.1

[56] References Cited

U.S. PATENT DOCUMENTS

| | | | |
|---|---|---|---|
| 1,531,182 | 3/1925 | Hartmann | 354/212 |
| 1,676,037 | 7/1928 | Lowkrantz | 354/212 |
| 3,213,775 | 10/1965 | Rehn | 354/212 |
| 3,943,536 | 3/1976 | Oshima | 354/212 |
| 4,395,107 | 7/1983 | Lührig et al. | 354/275 |
| 4,482,232 | 11/1984 | Engelsmann et al. | 242/71.1 |
| 4,746,943 | 5/1988 | Kohl | 354/215 |
| 4,875,638 | 10/1989 | Harvey | 354/275 |

Primary Examiner—L. T. Hix
Assistant Examiner—Cassandra C. Spyrou
Attorney, Agent, or Firm—Roger A. Fields

[57] ABSTRACT

A film cassette is disclosed wherein a filmstrip in roll form is stored within the cassette shell and has a leader that projects from an exterior end of a film passage slit in the cassette shell to permit the filmstrip to be drawn out of the shell. According to the invention, the leader has a forward edge portion that is folded back onto a successive portion of the leader to prevent the leader from being moved completely through the exterior end of the film passage slit into the cassette shell. Preferably, the forward edge portion of the leader is secured to the successive portion of the leader to form a looped portion of the leader between the forward edge and successive portions which may be engaged in a camera, for example, to draw the filmstrip out of the cassette shell.

7 Claims, 2 Drawing Sheets

FILM CASSETTE AND METHOD OF ASSEMBLING THE SAME

CROSS-REFERENCE TO A RELATED APPLICATION

Reference is made to commonly assigned copending application Ser. No. 379,745 entitled FILM CASSETTE with Towbar and filed July 14, 1989 in the name of William C. Atkinson now U.S. Pat. No. 4,913,368

BACKGROUND OF THE INVENTION

1. Field of the Invention

The invention relates generally to the field of photography and more particularly to film cassettes for roll film.

2. Description of the Prior Art

Light-trapped metal or plastic containers for a length of film to enable it to be loaded into a camera in full light are well known.

In the standard 35 mm type cassette, such as manufactured by Eastman Kodak Company, the filmstrip is stored in roll form on a flanged supply spool rotatably supported within a cylindrical cassette shell. A leader portion of the filmstrip, approximately two to two and one-half inches long, projects from an exterior end of a slit or "mouth" of the cassette shell defined by a a relatively short pair of lip-like substantially parallel extensions of the shell. A light-trapping velvet or plush lines the interior sides of the lips and usually protrudes slightly beyond respective forward tips of the lips. When the film cassette is placed in the loading chamber of a camera, the leader portion is either manually or automatically grasped to draw several inches of the filmstrip from the cassette shell to wind the leader portion onto a take-up spool in the camera.

A problem inherent in conventional cassettes is that the leader portion may be inadvertently wound into the cassette shell before the filmstrip is exposed in a camera. Once the leader portion is lost in this way, it is very difficult to retrieve.

3. The Cross-Referenced Application

The application cross-referenced above discloses a film cassette wherein a filmstrip in roll form is stored within the cassette shell and has a leader portion that projects from an exterior end of a film passage slit in the cassette shell to permit the filmstrip to be drawn out of the shell. According to the invention, a tow bar is secured to the leader portion. The tow bar normally is positioned in covering relation with the exterior end of the film passage slit to prevent the leader portion from being moved into the cassette shell and includes engageable means which may be engaged in a camera, for example, to separate the two bar from the cassette shell to draw the filmstrip out of the shell for exposure purposes.

SUMMARY OF THE INVENTION.

A film cassette is disclosed wherein a filmstrip in roll form is stored within the cassette shell and has a leader that projects from an exterior end of a film passage slit in the cassette shell to permit the filmstrip to be drawn out of the shell. According to the invention, the leader has a forward edge portion that is folded back onto a successive portion of the leader to prevent the leader from being moved completely through the exterior end of the film passage slit into the cassette shell. Preferably, the forward edge portion of the leader is secured to the successive portion of the leader to form a looped portion of the leader between the forward edge and successive portions which may be engaged in a camera, for example, to draw the filmstrip out of the cassette shell.

DETAILED DESCRIPTION OF THE PREFERRED EMBODIMENT

The invention is disclosed as being embodied preferably in a 35 mm film cassette. Because the features of this type of film cassette are generally well known, the description which follows is directed in particular to elements forming part of or cooperating directly with the disclosed embodiment. It is to be understood, however, that other elements not specifically shown or described may take various forms known to persons of ordinary skill in the art.

Figure 1:
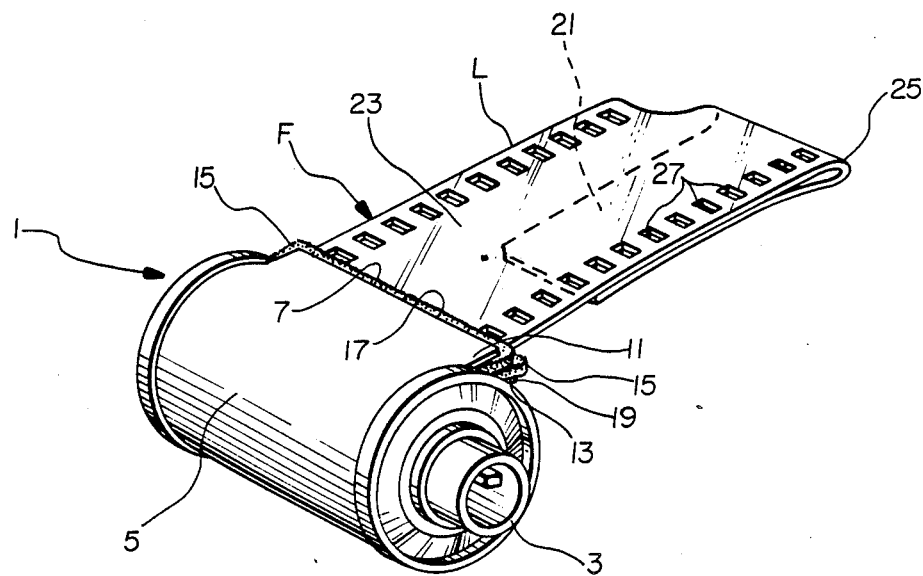
FIG. 1 is a perspective view of a film cassette according to a preferred embodiment of the invention.
Figure 2:
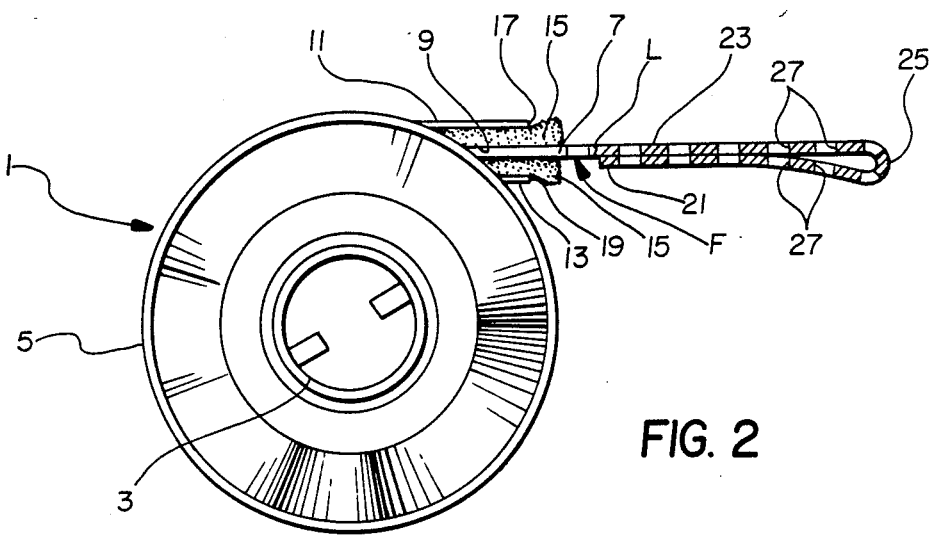
FIGS. 2 and 3 are side elevation views, partly in section, of the film cassette shown in FIG. 1.

Referring now to the drawings, FIGS. 1 and 2 show a 35 mm film cassette 1 wherein a filmstrip F is stored in roll form on a known flanged spool 3 (details not shown) rotatably supported within a cylindrical cassette shell or housing 5. A leader portion L of the filmstrip F projects from an exterior end 7 of a slit or "mouth" 9 of the cassette shell 5 defined by a relatively short pair of lip-like substantially parallel extensions 11 and 13 of the shell. A light-trapping velvet or plush 15 lines the interior sides of the respective lips 11 and 13. Although the plush 15 is shown in FIGS. 1 and 2 as extending slightly beyond respective forward tips 17 and 19 of the two lips 11 and 13, it may end at the forward tips.

Figure 3:
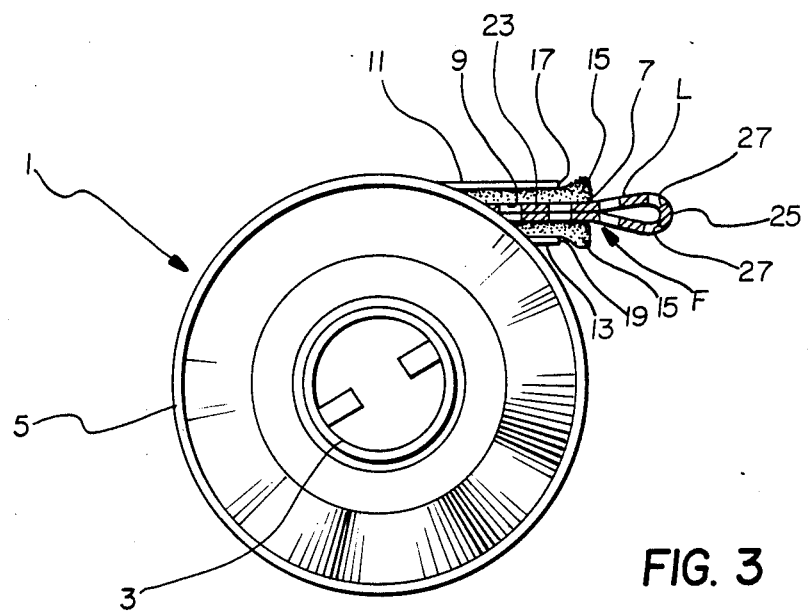

According to the invention, the leader L has a forward edge portion 21 that is folded back onto a successive portion 23 of the leader as shown in FIGS. 1–3, to prevent the leader from being moved completely through the exterior end 7 of the slit 9 into the cassette shell 5. The forward edge portion 21 of the leader L is secured by known means (not shown), such as glue, to the successive portion 23 of the leader to form a looped portion 25 of the leader between the forward edge and successive portions which may be engaged in a camera, for example, to draw the filmstrip F out of the cassette shell 5. Preferably, longitudinal edge perforations 27 in the leader L are aligned at the forward edge and successive portions 21 and 23 of the leader as shown in FIG. 2.

As shown in FIG. 3, the forward edge portion 21 of the leader L and the successive portion 23 of the leader normally extend into the slit 9 at its exterior end 7. As a result, the looped portion 25 of the leader L is normally located adjacent the exterior end 7 of the slit 9.

The invention has been described with reference to a preferred embodiment and an alternate embodiment. However, it will be appreciated that variations and modifications can be effected within the ordinary skill in the art without departing from the scope of the invention.

We claim:

1. An improved film cassette wherein a filmstrip in roll form is stored within the cassette shell and has a leader that projects from an exterior end of a film passage slit in said cassette shell to permit the filmstrip to be drawn out of the shell, and wherein the improvement comprises:

said leader having a forward edge portion that is folded back onto a successive portion of the leader to prevent the leader from being moved completely through the exterior end of said film passage slit into said cassette shell.

2. The improvement as recited in claim 1, wherein said forward edge portion of the leader is secured to said successive portion of the leader to form a looped portion of the leader between the forward edge and successive portions which may be engaged to draw said filmstrip out of said cassette shell.

3. The improvement as recited in claim 2, wherein said forward edge portion of the leader and said successive portion of the leader extend into said film passage slit at its exterior end.

4. The improvement as recited in claim 3, wherein said leader has longitudinal edge perforations that are aligned at said forward edge portion of the leader and said successive portion of the leader.

5. An improved method of assembling a film cassette including a filmstrip stored in roll form within the cassette shell and having a leader that projects from an exterior end of a film passage slit in the cassette shell to permit the filmstrip to be drawn out of the shell, wherein the improvement comprises:

folding a forward edge portion of the leader back onto a successive Portion of the leader to prevent the leader from being moved completely through the exterior end of the film passage slit into the cassette shell.

6. The improvement as recited in claim 5, further comprising:

securing the forward edge portion of the leader to the successive portion of the leader to form a looped portion of the leader between the forward edge and successive portions which may be engaged to draw the filmstrip out of the cassette shell.

7. The improvement as recited in claim 6, further comprising:

inserting the forward edge portion of the leader and the successive portion of the leader into the film passage slit at its exterior end.

* * * * *